United States Patent [19]

Brennan et al.

[11] 4,036,881
[45] July 19, 1977

[54] PREPARATION OF POLYALKYLENE POLYAMINES

[75] Inventors: Michael E. Brennan; Ernest L. Yeakey, both of Austin, Tex.

[73] Assignee: Texaco Development Corporation, New York, N.Y.

[21] Appl. No.: 583,017

[22] Filed: June 2, 1975

[51] Int. Cl.$^2$ .............................................. C07C 87/20
[52] U.S. Cl. .............................. 260/583 P; 252/435; 252/437; 260/584 R
[58] Field of Search ............ 260/583 P, 584 R, 585 B, 260/268 SY

[56] References Cited

U.S. PATENT DOCUMENTS

| | | | |
|---|---|---|---|
| 3,121,115 | 2/1964 | Meuly | 260/583 P X |
| 3,714,259 | 1/1973 | Lichtenwalter et al. | 260/583 P |

Primary Examiner—Daniel E. Wyman
Assistant Examiner—John J. Doll

Attorney, Agent, or Firm—Carl G. Ries; Thomas H. Whaley

[57] ABSTRACT

An improved process for selectively preparing a predominantly noncyclic polyalkylene polyamine compound is disclosed wherein an alkyleneamine compound is contacted with an alkanolamine compound in the presence of a catalytically effective amount of a phosphorus-containing substance at a temperature of from about 250° to about 350° C under a pressure sufficient to maintain the mixture essentially in liquid phase and the polyalkylene polyamine is then recovered from the resultant reaction mixture. In a preferred embodiment ethylenediamine is contacted with monoethanolamine to produce a predominantly linear polyethylene polyamine product with very low yields of heterocyclic amine materials. The desired polyethylene polyamines produced can be directly recovered from the reaction products by known purification procedures.

8 Claims, No Drawings

PREPARATION OF POLYALKYLENE POLYAMINES

BACKGROUND OF THE INVENTION

1. Field of the Invention

This invention relates to the preparation of predominantly noncyclic poyalkylene polyamine products and more particularly pertains to a liquid phase catalytic process for synthesizing predominantly noncyclic poly(n-alkylene amines) with low heterocyclic amine content.

2. Prior Art

Heretofore, polyalkylene polyamine compounds and particularly polyethylene polyamine compounds such as diethylenetriamine, triethylenetetramine, and the higher homologs as well as the related carbon-substituted homologs have been conventionally produced by reacting an alkyl halide, e.g. ethylene dichloride, with an amine compound such as ammonia, ethylenediamine, and the like at elevated temperatures and pressures. Generally speaking, relatively high yields of predominantly noncyclic polyethylene polyamine compounds are obtained along with varying yields of heterocyclic amines, e.g. piperazine materials. These processes, while generally employed throughout the industry, suffer from serious disadvantages.

Exemplary shortcomings of these procedures include large amounts of energy required to produce reactants and expensive recovery procedures. The resultant hydrohalide salts of ammonia and the polyamines must undergo caustic neutralization to obtain the free polyamines. Separation of the desired free polyamines is difficult and disposal of the polluting by-products, such as the alkali metal halide salt, is expensive. Additionally, the products produced possess undesirable colorants, limiting use of the material in color-critical applications.

There are several procedures described in the literature for directly preparing predominantly non-cyclic polyethylene polyamines by the condensation reaction of an aminoalkanol compound and an alkylatable amine compound which do not require neutralization of the reaction product to obtain the desired salt-free polyamines.

For example, U.S. Pat. No. 3,714,259 to Lichtenwalter et al. describes a catalytic process for the preparation of lower polyethylene polyamines such as diethylenetriamine, whereby an ethyleneamine compound and an ethanolamine compound are contacted in the presence of hydrogen and a hydrogenation catalyst comprised of oxides of nickel, copper, chromium, and like metals, in liquid phase at a temperature of 140° to 170° C. This procedure produces only lower polyethylene polyamines. In addition, the reaction requires extended reaction times to provide acceptable conversions. Yet, when the process is carried out under conditions which provide an acceptable conversion rate, selectivity is sacrificed with attendant production of by-products such as piperazine and piperazine products. The resulting amine product also contains considerable hydroxyl content, another disadvantage.

We have now discovered an improved catalytic process whereby predominantly noncyclic polyalkylene polyamines and preferably poly(n-alkylene polyamines) may be produced from the condensation of an alkanolamine compound with an alkyleneamine compound under economically feasible short reaction times. The improved process provides conversion rates of reactants and selectivity comparable to or higher than those obtained by conventional processes which require neutralization with alkali, as described hereinbefore. Surprisingly, it has been discovered that the condensation reaction may be carried out under rather severe processing conditions, such as temperatures above about 250° C in liquid phase without the expected decomposition and excessive by-product formation. For example, it is known that polyalkylene polyamines, and particularly the higher homologs of the ethyleneamines such as triethylenetetraamine, tetraethylenepentamine, etc. are thermally degradable. Moreover, as more particularly explained in the examples contained herein, experiments have shown that total reactants conversion are drastically improved under these processing conditions while selectivity is substantially maintained as compared to the use of less severe processing conditions.

Although it has previously been disclosed that certain phosphoric acid compounds are effective as catalysts in promoting condensation reactions between several types of amines, and aminoalkanols generally, the reaction conditions are relatively mild and/or the condensation sites are limited. For example, U.S. Pat. No. 3,121,115 to Meuly teaches a process for amino-alkylating certain amines having a replaceable amino hydrogen, particularly aromatic primary and secondary amines, which includes heating the amine compound with an N-tertiary amino-alkanol at from 150° to 250° C in liquid phase with continuous water removal in the presence of a phosphoric acid compound. The disclosed process requires long reaction times, a disadvantage mentioned hereinbefore, and the use of an N-tertiary aminoalkanol. Thus there is a limitation on the products formed and the possible sites for the condensation reaction to occur. In contrast, the alkyleneamine-alkanolamine reaction of the instant invention allows polycondensation, while being surprisingly selective to the predominantly noncyclic, linear product.

SUMMARY OF THE INVENTION

In accordance with the broader aspects of the instant invention, predominantly noncyclic polyalkylene polyamines are selectively produced directly from an alkyleneamine compound and alkanolamine compound by a process which includes contacting the alkyleneamine compound with the alkanolamine compound in the presence of a catalytically effective amount of a phosphorus-containing substance at temperatures of from about 250° to about 350° C under a pressure sufficient to maintain the mixture essentially in liquid phase. The polyalkylene polyamines thus produced are then recovered from the resultant reaction mixture.

In accordance with one embodiment, an n-alkylene diamine or higher homolog having two primary terminal amino groups is contacted with the corresponding n-alkanolamine having a single primary hydroxy group and a terminal primary amino group to produce higher homologs of the n-alkylene polyamine reactant.

In accordance with a preferred embodiment, ethylenediamine is contacted with monoethanolamine to produce predominantly noncyclic polyethylene polyamines such as diethylenetriamine, triethylenetetramine, tetraethylenepentamine and the like.

DESCRIPTION OF THE PREFERRED EMBODIMENT

Briefly, the present invention is an improved process for synthesizing predominantly noncyclic polyalkylene polyamines and preferably predominantly linear polyethylene polyamines such as diethylenetriamine and higher homologs. The inventive process involves contacting an alkyleneamine having primary amino groups, and preferably having an unbranched alkylene moiety such as ethylenediamine, with an alkanolamine having a primary or secondary hydroxy moiety and a primary amine and preferably having an unbranched alkylene moiety in the presence of a catalytically effective amount of a phosphorus-containing substance. The reactants are contacted at a temperature of from above about 250° to about 350°C under a pressure sufficient to maintain the reaction mixture essentially in liquid phase. The predominantly noncyclic polyethylene polyamines produced are recovered directly such as by conventional distillation techniques in high quality yields without any requirement of neutralization by the addition of alkali. The process provides acceptable conversion levels under relatively short reaction times, usually about one-half to 5 hours. Unexpectedly, formation of cyclic products, such as piperazine compounds, and excessively branched by-products is comparable to or below the amount normally obtained in conventional procedures for preparing polyethylene polyamines where neutralization procedures are required.

Generally, the polyalkylene polyamines that are produced in accordance with the instant invention can be depicted by the formula:

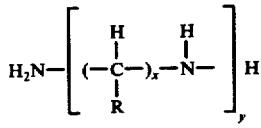

wherein R is hydrogen or a lower alkyl radical, $x$ is a number from 2 to about 6; and $y$ is a number from 2 to about 6. Examples of such compounds are dipropylenetriamine, tributylenetetramine, di-2-methylethylenetriamine, tri-2-ethylethylenetetramine and the like. This list is exemplary and not meant to be exhaustive of the polyalkylene polyamine compounds that can be formed.

The most preferred polyalkylene polyamine is a polyethylene polyamine of the above formula wherein R is hydrogen, $x$ is 2 and $y$ is a number from 2 to about 5. Examples of such compound is diethylenetriamine, triethylenetetramine, tetraethylenepentamine and the like.

The alkanolamine compounds which can be generally employed in the present invention include those represented by the formula:

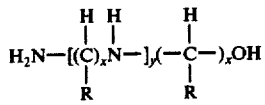

wherein R is hydrogen or a lower alkyl radical; $x$ is a number from 2 to about 6; and, $y$ is a number from 0 to about 3. The most preferred alkanolamine is an ethanolamine of the above formula wherein R is hydrogen, $x$ is 2 and $y$ is 0 to 3. Examples of such compounds are monoethanolamine, N-(2-aminoethyl) ethanolamine, etc.

The alkyleneamine reagent that can be used in accordance with the instant invention can be depicted by the general formula:

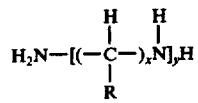

wherein R is a hydrogen or a lower alkyl radical, $x$ is a number from 2 to about 6 and $y$ is a number from 1 to about 4. The most preferred alkyleneamine reagent is ethylenediamine.

Suitable phosphorus-containing substances which can be employed include, for example, acidic metal phosphates, phosphoric acid compounds and their anhydrides, phosphorous acid compounds and anhydrides, alkyl or aryl phosphates esters, alkyl or aryl phosphite esters, alkyl or aryl substituted phosphorous acids and phosphoric acids, alkali metal monosalts of phosphoric acid, the thioanalogs of the foregoing, and mixtures of any of the above.

More particularly, suitable acidic metal phosphates include boron phosphate, ferric phosphate, aluminum phosphate, etc.

Suitable phosphoric acid compounds include aqueous or anhydrous phosphoric acids such as orthophosphoric acid, pyrophospheric acid, metaphosphoric acid, and condensed phosphoric acids such as polyphosphoric acids. Accordingly, an example of a suitable phosphorous acid is orthophosphorous acid.

In addition, any commercially available mono-, di-, or tri-alkyl or aryl phosphate or phosphite ester can be employed as the catalyst in the inventive process. Additionally, bis(phosphates) and secondary phosphate esters such as those disclosed in U.S. Pat. Nos. 3,869,526 and 3,869,527, respectively, can be used. Preferably, the lower alkyl esters are employed such as those having from 1 to about 8 carbon atoms per alkyl group. Preferred aryl esters contain from about 6 to about 20 carbon atoms and may include a phenyl group or alkyl-substituted phenyl group.

Further, suitable alkyl or aryl substituted phosphoric acids or phosphorous acids which may be employed as a catalyst include alkyl phosphonic acids, aryl phosphonic acids, alkyl phosphinic acids and aryl phosphinic acids. Preferably, such acids include alkyl or aryl groups and have from 1 to about 8 carbon atoms in each alkyl group and about 6 to about 20 carbon atoms in each aryl group.

Specific examples of alkyl and aryl substituted phosphorous and phosphoric acids that may be used in accordance with the invention are phenylphosphinic, ethylphosphonic, phenylphosphonic, naphthaphosphonic, and methylphosphinic acids. Examples of the alkyl and aryl substituted phosphorous and phosphoric acid esters are methylphenyl phosphonate, dimethylphenyl phosphonate, methylphenyl phosphinate, ethyl naphthaphosphinate, and propylmethyl phosphonate.

The above-mentioned phosphorus compounds are not intended to be exhaustive of those which may be employed as a catalyst material in the process of the present invention. Those materials are set forth to specify types of phosphorous compounds that we have found to be particularly effective as catalysts. Yet, of the compounds and types of compounds mentioned, we especially prefer to employ those that have been found to be most reactive under the processing conditions of the invention. These especially preferred compounds include boron phosphate, aqueous and anhydrous orthophosphoric acid, polyphosphoric acid, aluminum phosphate, ferric phosphate, aqueous and anhydrous orthophosphorous acid, triethylphosphite, triethylphosphate, and diethylphosphite, to name a few. Only a catalytically effective amount of the phosphorus substance is required to effect the condensation reaction between the reactants resulting in the formation of essentially salt-free predominantly non-cyclic polyethylene polyamines in good yield.

The quantity of phosphorus compound employed as the catalyst in the inventive process is somewhat empirical and can vary widely depending upon reactivity, the reactants present and particular reaction conditions employed. Usually this catalytic amount is within the range of from about 0.01 to about 10.0 wt. %, based upon the amount of alkanolamine material present; and preferably the catalyst is employed in an amount of from about 0.4 to about 5.0 wt. % based upon the amount of alkanolamine compound.

Any of the above-mentioned phosphorus compounds may be employed as the catalyst of the process either alone, in combination with one of the other mentioned phosphorus compounds, or in combination with acidic compounds such as boric acid and the like. These latter acid compounds are generally ineffective as catalysts by themselves in the inventive process.

According to a greatly preferred embodiment, monoethanolamine and ethylenediamine are intimately contacted by admixing. The admixture is then heated in the presence of the phosphorus-containing substance at a temperature of from about 250° to about 350° C and preferably at a temperature of about 275° to about 325°C, under a pressure sufficient to maintain the reaction means in liquid phase which normally ranges from about 200 to about 2,500 psig. The reaction is allowed to proceed at the temperature employed until the desired amount of conversion is obtained. Preferably the reaction is carried out under such conditions for a time period sufficient to provide a total reactants conversion of from about 10 to about 75% which is usually within the range of about 0.5 to about 5.0 hours.

The ethylenediamine and the monoethanolamine are utilized in molar ratios of from about 1:2 to about 5:1. Preferably, the molar ratio is abot 1:1 to about 2:1.

Generally the process of the invention can be carried out batchwise or continuously employing well-known batch and continuous processing techniques and conventional processing apparatus. Where the process is carried out continuously, we prefer to employ space velocities of reactants of from about 0.1 to about 4, and preferably from about 0.5 to 1.5, grams total reactants per milliliter of total reactor volume per hour.

In such continuous reaction processes, the above-described phosphorus-containing catalyst materials may be employed as a feed stream alone or admixed with a reactant feed stream, or they may be employed as a fixed bed catalyst in the continuous reactor system. Generally speaking, these fixed bed catalysts comprise the phosphorus-containing catalyst material supported on a material such as silica, silica-alumina, alumina, diatomaceous earth, etc., conventionally employed as inert reactor packing materials. Such fixed bed supported catalysts and procedures for their preparation are well-known in the art and many are readily available commercially.

It is not critical to control the amount of water of reaction present during the heating of reactants and catalyst, such as by removal thereof as it is formed. Usually, we prefer to retain the water in the reaction zone and remove it from the reaction mass during recovery of the predominantly non-cyclic polyalkylene polyamines.

The desired mainly non-cyclic polyalkylene polyamine compounds may be readily recovered from the reaction product mass by conventional procedures, such as distillation, without difficulty. For example, the reaction product mass may be directly distilled, or initially filtered to remove a small amount of formed solids which usually are amine salt complexes of the phosphorus compound catalyst, and then distilled. The desired polyalkylene polyamine compounds may then be separately collected overhead in salt-free form. Such distillation recovery procedures are well-known in the art and, therefore, will not be more particularly discussed herein.

It will be realized that the starting reactants such as the lower alkanolamines can be produced in situ by the catalyzed reaction of ammonia with, for example the correspnding alkylene diol and/or epoxide. Likewise, the lower alkyleneamines can be produced from ammonia and the corresponding alkanolamine. Thus, in accordance with the instant invention, polyalkylenepolyamines can be produced from the basic materials of, for example an alkylene oxide and ammonia. Although possible, such a procedure is not preferred. It is preferred, therefore, that the desired alkanolamines and/or alkylenediamines be initially prepared, isolated and introduced into the instant process in desired quantities in accordance with the invention.

One outstanding advantage of the instant invention resides in the fact that lower alkylene polyamines after separation by, for example fractional distillaton, can be returned to the reaction zone to undergo further reaction with the alkanolamines, thus producing more of the higher products. Those skilled in the art will immediately see the many ways of selectively obtaining a desired product mixture by use of reactants, reaction conditions, recycling techniques and the like.

The following examples illustrate the nature of the inventive process but are not intended to be limitative thereof. For purposes of brevity the reactant compounds employed and the products obtained are often abbreviated in the following Examples and Tables. The compound abbreviations are:

MEA — Monoethanolamine
AEEA — N-(2-aminoethyl)ethanolamine
HEP — N-(2-hydroxyethyl)piperazine
EDA — Ethylenediamine
DETA — Diethylenetriamine
AEP — N-(2-aminoethyl)piperazine
TETA — Triethylenetetramine
TEPA — Tetraethylenepentamine
PEHA — Pentaethylenehexamine
TETA isomers:
  NTEA — Nitrilotrisethylamine
  TETA — Triethylenetetramine
  DiAEP — Diaminoethylpiperazine
  PEEDA — Piperazinoethylethylenediamine
TEPA Isomers:
  AETETA — 4-Aminoethyltriethylenetetramine
  TEPA — Tetraethylenepentamine
  AEPEEDA — Aminoethylpiperazinoethylethylenediamine
  PEDETA — Piperazinoethyldiethylenetriamine

EXAMPLE I

To a dry, nitrogen purged 1-liter stainless steel autoclave equipped with stirring means was charged a solution of 305.4 g. (5.0 moles) monoethanolamine and 150.2 g. (2.5 moles) ethylenediamine. 15.3 g. (0.14 mole; 5.0 wt.% and 2.8 mole%, basis monoethanolamine) commercial boron phosphate was then added to the solution mixture. The autoclave contents were padded with nitrogen, heated to 275° C. over a period of 1 hour and 20 minutes whereby pressure increased to 310 psig and then held for 2.0 hours at 274°–278° C. under a pressure of 310–475 psig. After cooling to room temperature the reaction mixture weighed 456.0 g. which represented 96.9 weight percent recovery of the total charge. The liquid reaction product was then analyzed by gas-liquid chromatography (GLC, Area %) which showed it contained 2.9 lights (consisting of mostly water and ammonia), 24.0 ethylenediamine, 44.2 monoethanolamine, 1.6 piperazine, 13.7 diethylenetriamine, 5.5 N-(2-aminoethyl)ethanolamine, 1.7 N-(2-aminoethyl)piperazine, and/or N-(2-hydroxyethyl)piperazine, 5.7 triethylenetetramine isomers, and 0.7 tetraethylenepentamine isomers. Conversion of reactants was 24.0 percent for ethylendiamine, 34.1 percent for monoethanolamine and 31.8 percent for the total reactants.

EXAMPLE II 400.0 g. of an aqueous solution of ethylenediamine (91 weight % ethylenediamine — 9 weight % water; 6.1 moles ethylenediamine) and 20.0 g. (0.18 mole; 3.0 mole %) boron phosphate were charged to the reaction equipment described in Example I, padded with nitrogen and heated at a temperature of 275°–280° C. under a pressure of 525–560 psig for 2.0 hours. Analysis of the liquid reaction mixture by gas-liquid chromatography, after cooling to room temperature, showed ethylenediamine was the only polyamine present, indicating no reaction had occurred.

EXAMPLE III

Employing the reaction equipment and processing steps described in Example I, 400.0 g. (6.7 moles) ethylenediamine (99.0 weight % minimum) and 20.0 g. (0.18 mole; 2.69 mole%) boron phosphate were admixed and heated at 300°–301° C. under a pressure of 650–675 psig for 2.0 hours. The experiment was repeated employing the same amount of ethylenediamine except that aluminum phosphate and ferric phosphate were respectively employed as the catalyst material, each of these latter experiments being conducted at 325° C. under the same heating time. No reaction was observed in any of the experiments and 99.9 weight % pure ethylenediamine was recovered from each reaction mixture as determined by gas-liquid chromatography. The results of these experiments and that described in Example II illustrate the requirement of employing an alkylating material such as an ethanolamine compound or ethylene glycol in the process of the invention.

EXAMPLE IV

Employing the procedure and reaction equipment described in Example I, a solution of 214.0 g. (3.50 moles) monoethanolamine, 193.6 g. (3.22 moles) ethylenediamine, 16.4 g. water and 10.7 g (2.8 mole %, 5.0 weight %, basis monoethanolamine) boron phosphate was heated to about 305° C. and held for 2.0 hours under 600–825 psig. Analysis of the liquid reaction product effluent by gas-liquid chromatography showed it contained (GLC, Area %) 16.9 lights (16.2 weight % water determined by Karl Fischer titration), 26.4 ethylenediamine, 14.31 monoethanolamine, 2.2 piperazine, 0.3 unknown, 20.2 diethylenetriamine, 1.0 N-(2-aminoethyl) ethanolamine, 3.2 N-(2-aminoethyl)piperazine, 0.1 unknown, 11.2 triethylenetetramine (TETA) isomers (84.8 % non-cyclic), 0.4 unknown, 3.5 tetraethylenepentamine (TEPA) isomers (82.8 % non-cyclic), and 0.3 A % pentaethylenehexamine (PEHA) and heavier materials. Conversion was determined as 42.3 % for ethylenediamine, 70.9 % for monoethanolamine and 55.4 % for the total reactants.

The liquid reaction product was also distilled whereby fractions of TETA isomers and TEPA isomers were respectively collected. It was determined that the TETA and TEPA fractions contained 83.4 % and 74.2 % non-cyclics.

The percent non-cyclic ratio of the TETA isomers and TEPA isomers for both the GLC analyses of reaction effluent and distilled fractions were respectively calculated using the following formula:

For TETA Isomers:

$$\% \text{ Non-cyclics} = \frac{\text{NTEA + TETA}}{\text{Total TETA Isomers}} \times 100$$

For TEPA Isomers:

$$\% \text{ Non-cyclics} = \frac{\text{AETETA + TEPA}}{\text{Total TEPA Isomers}} \times 100$$

This example illustrates the selectivity of the process of the invention in preparing high yields of predominantly non-cyclic polyethylene polyamines. In addition, bis-aminoethyl ether and N-(2-hydroxyethyl)-diethylenetriamine were not detected by the gas-liquid chromatography analysis which further illustrates the selectivity of the process.

EXAMPLE V

Employing the general procedure and reaction equipment described in Example I, several runs were conducted employing various temperatures and reactant mole ratios of monethanolamine and ethylenediamine as set forth in the following Table 1. Except those indicated, the runs were conducted employing 5.0 weight % (2.8 mole %) commercial boron phosphate, basis monoethanolamine present. All of the runs were conducted by holding the designated temperature for a time period of 2.0 hours and products were analyzed by gas-liquid chromatography.

The results of Table 1 show the selectivity of the inventive process to the preparation of predominantly non-cyclic polyethylene polyamines where contemplated molar ratios of aminoalkanol:amine and temperatures are employed. Run Nos. 7–9 also illustrate the effectiveness of aluminum phosphate and ferric phosphate as catalysts in the process.

Table 1

| Run No. | MEA/EDA Mole Ratio | Temp., °C. | Pres. psig | % Conversion | Piperazine | DETA | AEEA | AEP-HEP | TETA | (% NC)[1] | TEPA | (% NC)[1] | PEHA+ |
|---|---|---|---|---|---|---|---|---|---|---|---|---|---|
| 1 | 0.5 | 275 | 390—390 | 9.0 | 1.1 | 87.7 | 5.6 | 1.1 | 4.5 | — | — | — | — |
| 2 | 0.5 | 301 | 575–625 | 29.9 | 2.3 | 71.5 | 1.1 | 1.9 | 19.8 | — | 3.4 | — | — |
| 3 | 1.0 | 274 | 390–410 | 23.0 | 2.8 | 68.7 | 10.3 | 1.8 | 15.9 | — | 0.5 | — | — |
| 4 | 1.0 | 300 | 500–775 | 52.8 | 3.8 | 52.3 | 1.4 | 4.7 | 26.8 | (87.2) | 9.3 | (89.2) | 1.6 |
| 5 | 2.0 | 275 | 340–490 | 38.5 | 5.4 | 45.3 | 11.6 | 6.3 | 23.9 | — | 6.9 | — | 0.3 |
| 6 | 2.0 | 302 | 500–1100 | 70.4 | 7.1 | — 29.5 — | | 14.2 | 27.8 | — | 14.2 | — | 5.7 |
| 7[2] | 2.0 | 301 | 500–520 | 10.9 | 13.5 | 49.0 | 28.8 | 1.9 | 1.9 | — | — | — | 1.9 |
| 8 | 1.0 | 300 | 625–650 | 6.4 | 1.8 | 87.5 | — 10.7 — | | — | — | — | — | — |
| 9[3] | 1.0 | 300 | 625–650 | 6.7 | 1.6 | 82.8 | — 14.0 — | | 1.6 | — | — | — | — |

[1] percent non-cyclics
[2] 5.0 weight % (2.5 mole %) aluminum phosphate, basis monoethanolamine
[3] 5.0 weight % (2.0 mole %) ferric phosphate, basis monoethanolamine

EXAMPLE VI

Several runs were conducted employing the procedure described in Example I, wherein equimolar solutions of monoethanolamine and ethylenediamine were heated in the presence of various amounts of boron phosphate catalyst at a temperature of 300° C. under 500–950 psig for various periods of time as set forth in the following Table 2. The liquid reaction product of each run, after cooling to room temperature, was analyzed by gas-liquid chromatography (GLC Area %, light-ethylendiamine-monoethanolamine free), the results of which are also set forth in the following Table 2.

The results of Table 2 illustrate that different levels of boron phosphate catalyst can be employed in the process of the present invention. In addition, a comparison of Run No. 3 with Run Nos. 1 and 2, and Run No. 5 with Run No. 4 show that attempts to increase conversion of reactants by holding the reactants at high temperatures for longer periods of time can result in increased formation of cyclic products.

reaction was repeated employing the same amount of monoethanolamine and boron phosphate catalyst except that the reaction mixture was heated at 300° C. for 2.0 hours under 475–1,400 psig. Analysis of the reaction product mass showed complete monoethanolamine conversion was obtained and that the reaction product mass contained the following yields of materials: 10.6 piperazine, 9.9 unknown, 20.2 AEP/HEP and 57.1 higher condensates.

The experiments of this example illustrate the requirement of employing an alkylatable amine compound in the process of the invention. They demonstrate that exposing an ethanolamine compound alone to the process conditions of the invention result in very low yields, if any, of desired non-cyclic polyethylene polyamines.

EXAMPLE VIII

A series of runs were conducted employing the procedure of Example I wherein equimolar solutions of monoethanolamine-ethylenendiamine were heated at 300° C for 2.0 hours under autogeneous pressure in the Table 2

| Run No. | Catalyst [1] Wt. % | Mole % | Reaction Time, hrs. | % Total Conversion | Piperazine | DETA | AEEA | AEP-HEP | TETA | (% NC) [2] | TEPA | (% NC) [2] | PEHA+ |
|---|---|---|---|---|---|---|---|---|---|---|---|---|---|
| 1 [3] | 5.0 | 2.8 | 2.0 | 52.8 | 3.8 | 52.3 | 1.4 | 4.7 | 26.8 | (87.2) | 9.3 | (89.2) | 1.6 |
| 2 | 5.0 | 2.8 | 2.0 | 59.0 | 4.6 | 48.1 | 1.3 | 6.8 | 26.5 | (86.0) | 9.4 | (81.4) | 2.0 |
| 3 | 5.0 | 2.8 | 3.0 | 62.2 | 5.8 | 47.3 | 0.4 | 9.7 | 28.0 | (65.9) | 7.9 | — | — |
| 4 | 2.5 | 1.4 | 2.0 | 39.5 | 4.4 | 60.5 | 3.0 | 5.1 | 23.0 | (66.2) | 3.0 | — | — |
| 5 | 2.5 | 1.4 | 3.0 | 44.1 | 5.2 | 57.2 | 0.9 | 6.6 | 25.6 | (56.2) | 4.3 | — | — |

[1] Basis MEA
[2] percent non-cyclics
[3] 1-liter stirred autoclave; other runs in 1400 ml rocking autoclave

EXAMPLE VII 458.0 g. (7.5 moles) of monoethanolamine was charged to a 1-liter autoclave equipped with stirring means along with 5.0 weight % (2.8 mole percent) boron phosphate, basis monoethanolamine present. The autoclave was purged with nitrogen, sealed and then the mixture was heated at 275° C. for 2.0 hours under a pressure of 290–560 psig. Analysis of the cooled reaction product mass showed 46.3 % conversion of the monoethanolamine was obtained. The reaction mass contained 15.8 wt.% water and, as determined by gas-liquid chromtography (GLC Area %) 53.7 monoethanol-amine, 2.9 piperazine, 9.9 diethylenetriamine/N-(2-aminoethyl)ethanolamine, 6.3 N-(2-aminoethyl)-piperazine/N-(2-hydroxyethyl)piperazine, and 11.3 hgher amines and condensation products which resembled higher polyethylene polyamines but had many additional peaks in that area of the chromatogram. The presence of varying amounts of phosphorus containing compounds as catalysts listed in the following Table 3. As shown, the catalysts employed in these runs included boron phosphate, 85% orthophosphoric acid, orthophosphoric acid supported on silica and mixtures of 85% orthophopshoirc and boric acids. Except where indicated in Table 3, the runs were conducted in a 1400 ml rocking autoclave. The liquid reaction product effluent from each run was analyzed by gas-liquid chromatography (GLC Area %) the results of which, along with percent total conversion of reactants, are also set forth in the following Table 3.

The results of Table 3 illustrate the effectiveness of varying amounts of differing types of phosphorus containing materials for selectively preparing predominantly noncyclic polyethylene polyamines at acceptable conversion of reactants rate. When boric acid was utilized alone, i.e. without the phosphorus containing compound, essentially no reaction was observed.

Table 3

| Run No. | Catalyst (Moles) 85% H₃PO₄ | Boric Acid | Other | % Total Conversion | Piper-azine | DETA | AEEA | AEP-HEP | TETA | (% NC)[1] | TEPA | (% NC)[1] | PEHA+ |
|---|---|---|---|---|---|---|---|---|---|---|---|---|---|
| 1 | — | — | BPO₄[2] 0.108 | 52.8 | 3.8 | 52.3 | 1.4 | 4.7 | 26.8 | (87.2) | 9.3 | (89.2) | 1.6 |
| 2 | — | — | BPO₄ 0.108 | 59.0 | 4.6 | 48.1 | 1.3 | 6.8 | 26.5 | (86.0) | 9.4 | (81.4) | 2.0 |
| 3 | — | — | BPO₄ 0.054 | 39.5 | 4.4 | 60.5 | 3.0 | 5.1 | 23.0 | (66.2) | 3.0 | — | — |
| 4 | 0.108 | — | — | 42.8 | 4.4 | 58.9 | 1.1 | 6.4 | 25.8 | (80.7) | 2.8 | — | — |
| 5 | 0.108[2] | — | — | 65.8 | 6.6 | 51.2 | 0.0 | 9.6 | 29.5 | (66.7) | 2.4 | — | — |
| 6 | 0.054 | — | — | 45.5 | 4.2 | 54.7 | 2.5 | 4.9 | 24.1 | (91.1) | 8.1 | — | 1.2 |
| 7 | 0.054 | — | — | 43.2 | 4.0 | 53.8 | 3.7 | 4.7 | 23.5 | (90.1) | 7.4 | (84.6) | 2.4 |
| 8 | — | — | T-1563[3] 0.047 | 51.2 | 5.2 | 64.5 | 0.0 | 6.4 | 23.7 | (76.7) | — | — | — |
| 9 | — | — | T-1510[3] 0.047 | 45.7 | 5.2 | 50.1 | 0.7 | 7.7 | 25.7 | (76.7) | 8.2 | (48.3) | 0.2 |
| 10 | 0.108 | 0.108 | — | 47.5 | 5.2 | 57.7 | 0.0 | 8.5 | 26.3 | (59.1) | 1.8 | — | — |
| 11 | 0.108 | 0.108 | — | 59.5 | 5.0 | 46.4 | 1.0 | 7.9 | 26.6 | (81.4) | 8.8 | (79.5) | 2.5 |
| 12 | 0.108 | 0.072 | — | 53.6 | 4.6 | — 53.4 — | | 7.8 | 25.7 | (81.5) | 6.3 | (76.9) | 0.4 |
| 13 | 0.108 | 0.036 | — | 48.8 | 3.7 | — 55.5 — | | 6.9 | 25.2 | (84.0) | 7.1 | (82.1) | 0.7 |
| 14 | 0.108 | 0.144 | — | 56.7 | 4.6 | 49.4 | 0.2 | 6.8 | 26.5 | (86.0) | 9.6 | (80.5) | 1.4 |

[1] Percent non-cyclics;
[2] 1-liter stirred autoclave;
[3] Girdler (Chemical Inc.), 20.0 wt. % H₃PO₄ on silica.

EXAMPLE IX

Several additional runs were conducted employing the same reactants, amounts of reactants, reaction conditions and procedures as described in Example VIII, wherein various phosphorus-containing compounds were employed in various amounts as catalysts, as set forth in the following Table 4. In Run Nos. 1 and 2, 30 % aqueous orthophosphorous acid was employed as the catalyst. In Run Nos. 3 and 4, mixtures of 30 % aqueous orthophosphorous acid and boric acid were employed. Table 4 also sets forth in percent total conversion of reactants and analysis of the resulting reaction products by gas-liquid chromatography (GLC Area %).

The results of Table 4 further demonstrates the wide variety of phosphorus containing compounds effective in the inventive process for synthesizing predominantly non-cyclic polyethylene polyamines at economically high conversions while maintaining high product linearity.

mole; 2.3wt.% and 1.44 mole%, basis MEA) 85% phosphoric acid and heated at 250° C. under 225 - 225 psig pressure for 2.0 hours. Analysis of the reaction product by gas-liquid chromatography (GLC Area %) showed a total conversion of reactants of only 4.7% was obtained. The reaction products were 95.0 diethylenetriamine, 2.5 piperazine and 2.5 Area % N-(2-aminoethyl)-ethanolamine. No higher polyethylene polyamines, e.g., triethylenetetramine, tetraethylenepentamine, etc. were formed.

The results of this example illustrate that the process of the invention may be carried out at 250° C. in liquid phase. However, a comparison of the results of this example with those of the previous examples demonstrates the drastic increase in conversion obtained by using more severe processing conditions of the invention while maintaining high product linearity to provide for an economically feasible commercial process. As shown by this example, no higher polyethyelene polyamine compounds were formed.

Table 4

| Run No. | Catalyst (Moles) 30 % H₃PO₃ | Boric Acid | Other | % Total Conversion | Piper-azine | DETA | AEEA | AEP-HEP | TETA | (% NC)[1] | TEPA | (% NC)[1] | PEHA+ |
|---|---|---|---|---|---|---|---|---|---|---|---|---|---|
| 1 | 0.108 | — | — | 38.0 | 4.3 | 53.2 | 4.0 | 5.1 | 23.7 | (88.6) | 7.5 | (84.0) | 1.6 |
| 2 | 0.054 | — | — | 38.5 | 4.2 | 56.8 | 3.6 | 4.4 | 23.4 | (92.3) | 6.4 | (90.5) | 0.6 |
| 3 | 0.108 | 0.108 | — | 48.6 | 5.2 | 45.8 | 2.6 | 7.1 | 25.2 | (81.8) | 8.8 | (77.2) | 2.6 |
| 4 | 0.108 | 0.072 | — | 36.1 | 4.5 | 56.6 | 1.4 | 5.1 | 24.5 | (89.7) | 7.3 | (82.6) | — |
| 5 | — | — | 0.100[2] | 34.6 | 13.8 | 50.8 | 0.0 | 10.4 | 10.4 | — | 5.0 | — | — |
| 6 | — | — | 0.100[3] | 26.5 | 8.7 | 63.0 | 2.7 | 6.4 | 16.0 | — | 0.4 | — | — |
| 7 | — | — | 0.100[4] | 66.4 | 6.3 | 35.3 | 1.1 | 13.9 | 28.8 | (46.8) | 8.8 | — | — |
| 8 | — | — | 0.100[5] | 45.7 | 3.7 | — 64.1 — | | 4.6 | 21.3 | (87.5) | 5.6 | (82.6) | 0.2 |
| 9 | — | — | 0.100[6] | 60.8 | 4.5 | 19.2[7] | 10.8 | 6.7 | 23.1 | (81.4) | 8.4 | (78.0) | 1.8 |
| 10 | — | — | 0.100[8] | 18.5 | 4.2 | — 72.1 — | | 6.1 | 15.2 | — | 2.4 | — | — |
| 11 | — | — | 0.100[9] | 27.5 | 5.6 | 69.8 | 0.0 | 3.0 | 19.8 | — | 0.9 | — | — |
| 12 | — | — | 0.050[10] | 39.4 | 4.4 | 59.5 | 3.3 | 4.7 | 23.4 | (91.2) | 4.4 | (73.4) | 0.3 |

[1] Percent non-cyclics
[2] phenylphosphonic acid
[3] phenylphosphinic acid
[4] polyphosphoric acid
[5] triphenylphosphite
[6] triphenylphosphate
[7] 23.9% unknown not listed
[8] KH₂PO₄
[9] NaH₂PO₄·H₂O
[10] Diethylphosphite

EXAMPLE X

Employing the reaction equipment and general procedures described in Example I, a solution of 229.0 g. (3.75 moles) monoethanolamine and 225.0 g. (3.75 moles) ethylenediamine was admixed with 6.25 g. (0.054

EXAMPLE XI

Employing a 1400 ml. rocking autoclave and the general procedures described in Example I, several runs were conducted to demonstrate the effectiveness of various types of catalysts containing boron phosphate prepared by different methods and deposited on various support materials and admixtures of boron phosphate and aluminum phosphate in the process of the invention. All of the runs were carried out by heating equimolar solutions of monoethanolamine and ethylenediamine in the presence of 5.0 wt.%, basis MEA present, catalyst at 300° C. under autogenous pressure for 2.0 hours. The type of catalyst employed and analytical results, determined by gas-liquid chromatography (GLC Area %), are set forth in the following Table 5.

tures of 250°-400° C. The space velocities were approximately 1.5-3.2 g/ml catalyst/hr. Analysis of the effluent indicated that the ethylenediamine was essentially inert until almost all the MEA was consumed. The resulting products were complex and highly cyclic.

EXAMPLE XIII

By employing the procedure described in Example I, several runs were conducted in preparing polyethylene polyamine reaction products by the boron phosphate catalyzed reaction of various ethanolamine compounds and ethylenepolyamine compounds employed in various molar ratios, as set forth in the following Table 6. In Table 5

| Run No. | Catalyst | % Total Conversion | Piperazine | DETA | AEEA | AEP-HEP | TETA | (% NC)[1] | TEPA | (% NC)[1] | PEHA+ |
|---|---|---|---|---|---|---|---|---|---|---|---|
| 1 | BPO$_4$[2] | 58.3 | 4.7 | 44.2 | 2.0 | 7.4 | 26.0 | (82.7) | 10.2 | (78.0) | 3.5 |
| 2 | BPO$_4$[3] | 54.9 | 4.1 | 51.7 | 2.5 | 5.0 | 26.0 | (87.5) | 9.0 | (86.5) | 0.9 |
| 3 | BPO$_4$[4] on support | 53.4 | 7.2 | 51.1 | 0.5 | 7.5 | 25.9 | (80.4) | 6.1 | — | 0.3 |
| 4 | BPO$_4$[5] | 52.3 | 14.0 | 49.7 | 2.7 | 10.7 | 15.8 | (69.2) | 1.2 | — | — |
| 5 | BPO$_4$[6] | 43.5 | 9.7 | 52.0 | 3.4 | 6.6 | 19.1 | (86.9) | 3.1 | (70.0) | 0.3 |

[1] % non-cyclics
[2] 3/16" tablets
[3] Prepared in xylene from equimolar boric and phosphoric (85%) acid according to Italian Patent No. 715,579 (Oct. 1, 1966) (CA: 69, P53303 g).
[4] 46.0 wt.% equimolar prepared BPO$_4$ deposited on Celite 408 diatomaceous earth (sold by Johns-Manville Products Corporation) and calcined at 1000° C. for 15.0 hours.
[5] 29.0 wt.% equimolar prepared BPO$_4$ deposited on Carborundum CLT silicon carbide (sold by Carborundum Co.) and calcined at 1000-1060° C. for 15.0 hours.
[6] 50/50 mole % BPO$_4$/AlPO$_4$ calcined at 400° C. for 16.0 hours.

EXAMPLE XII

In this example, monoethanolamine and ethylenediamine were contacted in the presence of a phosphorus-containing substance in vapor phase at 250°-400° C to show a contrast between the vapor phase and liquid phase as utilized in the instant invention.

A downflow reactor having a diameter of 1 inch and containing therein 3/16 inch tablets of boron phosphate catalyst (sold by The Harshaw Chemical Co., Division of Kewanee Oil Co., 1945 East 97th Street, Cleveland, Ohio 44106) was heated with an electrical tube furnace. An equimolar mixture of monoethanolamine and ethylenediamine was introduced into a nitrogen steam and fed to the reactor at atmospheric pressure and temperaeach run, the reactant mixture was heated in the presence of 5.0 weight percent boron phosphate, basis ethanolamine compound present, at the indicated temperature for 2.0 hours under autogeneous pressure. The types of reactants, molar ratios, percent total conversion and analysis of reaction product mass obtained by gas-liquid chromatography for each run is set forth in the following Table 6.

The results of Table 6 illustrate the effectiveness of the process of the invention for selectively synthesizing high yields of mainly non-cyclic polyethylene polyamines, particularly the higher polyethylene polyamines employing several types of ethanoalamine compounds and ethylene-polyamine compounds.

Table 6

| Reactants (Molar Ratio) | % Total Conv. | \multicolumn{9}{c|}{Products (GLCA %, lights=E₂O-Reactants free)} | Mole % Catalyst | Temp., °C | Pressure psig |
|---|---|---|---|---|---|---|---|---|---|---|---|---|---|
| | | EDA | MEA | Pip. | DETA | AEEA | AEP-HEP | TETA | TEPA | PEHA+ | | | |
| AEEA-EDA (1/4) | 12.5 | — | — | 27.1 | — | — | — | 72.9(1) | — | — | 4.8 | 275 | 525-600 |
| AEEA-EDA (1/1) | 30.2 | — | — | 15.9 | 2.7 | — | 2.7 | 64.2(2) | 1.4 | 8.8 | 4.8 | 280-275 | 450-510 |
| AEEA-EDA (1/2) | 58.5 | — | — | 15.3 | 1.9 | — | 1.3 | 64.8(3) | 3.1 | 13.6 | 4.8 | 275 | 275-460 |
| MEA-DETA (1/1) | 42.0 | — | — | 4.7 | — | 1.1 | 11.4 | 55.0(4) | 18.3(5) | 0.8 | 2.8 | 302-300 | 300-625 |
| AEEA-DETA (1/1) | 35.7 | 7.2 | — | 23.3 | — | — | 8.1 | 28.3 | 40.4(6) | — | 4.8 | 275 | 225-500 |
| MEA-AEEA-EDA (1/1/2) | 43.6 | — | — | 15.0 | 24.2 | — | 9.2 | 42.8(7) | 8.6 | 3.8 | 277-300(8) | 500-775(8) |

(1)% non-cyclics: 86.8
(2)% non-cyclics: 84.0
(3)% non-cyclics: 72.3
(4)% non-cyclics: 82.9
(5)% non-cyclics: 57.6
(6)% non-cyclics: 65.4
(7)% non-cyclics: 66.7
(8)1 hour at 280-277° C., 560-575 psig; 1 hour at 300° C., 750-775 psig

EXAMPLE XIV

In this example, several continuous runs were conducted to demonstrate the applicability of the inventive concept to continuous processing. The runs were conducted by passing an equimolar monoethanolamine and ethylenediamine feed stream through a 500 ml continuous pressure reactor over a contained fixed bed of 475 ml of catalyst at various space velocities. The runs were conducted at various temperatures under a pressure of 1500 psig. The type of catalyst, temperature, space velocity, percent total conversion, and analysis of resulting reaction product mixture by gas-liquid chromatography (GLC area %) for each run are set forth in the following Table 7.

Table 7

| Run No. | Catalyst | Temp., °C. | Space Vel. g./ml.cat./hr. | % Total Conversion | Piperazine | DETA | AEEA | AEP-HEP | TETA | TEPA | PEHA+ |
|---|---|---|---|---|---|---|---|---|---|---|---|
| 1 | A | 325 | 0.81 | 28.0 | 8.6 | 53.8 | 6.7 | 7.0 | 21.8 | 1.5 | — |
| 2 | A | 352 | 1.06 | 46.0 | 10.4 | 29.6 | 2.2 | 11.7 | 22.7 | 13.4 | 6.8 |
| 3 | B | 346 | 0.50 | 56.1 | 19.3 | 16.1 | — | 17.0 | 28.4 | 5.8 | 7.9 |
| 4 | C | 300 | 0.56 | 35.4 | 8.5 | 71.7 | — | 6.5 | 13.2 | — | — |
| 5 | C | 325 | 0.51 | 53.5 | 33.0 | 32.1 | — | 11.0 | 9.7 | — | — |
| 6 | D | 300 | 0.53 | 75.3 | 14.2 | 14.8 | — | 32.0 | 34.4 | — | — |

A Girdler T-1563, 20.0 wt.% H₃PO₄ on silica, ¼" extrs.
B ½Girdler T-1510 (3/16" spheres) + ½T-1563, 20.0 wt.% H₃PO₄ on silica
C 15.0 wt.% BPO₄ on Carborundum CLT, ⅛ × ⅛"
D Davison SMR 7-4757 50.0 wt.% BPO₄ on silica, 0.156" diameters While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. A process for preparing predominantly noncyclic polyalkylene polyamines comprising the steps of:

contacting an alkyleneamine compound having two primary amino groups of the general formula:

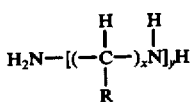

wherein R is a hydrogen or a lower alkyl radical, x is a number from 2 to about 6 and y is a number from 1 to about 4 with an alkanolamine compound having a primary amino group and a primary or secondary hydroxy group of the general formula:

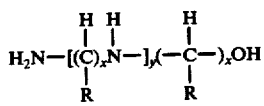

wherein R is a hydrogen or a lower alkyl radical; x is a number from 2 to about 6; and, y is a number from 0 to about 3 in the presence of a catalytically effective amount of a phosphorus-containing substance selected from the group consisting of acidic metal phosphates, phosporic acid compounds and their anhydrides, phosphorous acid compounds and their anhydrides, alkyl or aryl phosphate esters, alkyl or aryl phosphite esters, alkyl or aryl substituted phosphorous and phosphoric acids wherein said alkyl groups have from 1 to about 8 carbon atoms and said aryl groups have from 6 to about 20 carbon atoms, alkali metal monosalts of phosphoric acid, the thioanalogs of the foregoing, and mixtures of the above at temperatures of from about 250° to about 350° C under a pressure sufficient to maintain the mixture essentially in liquid phase, and, recovering said polyalkylene polyamines from the resultant reaction mixture.

2. The process of claim 1, wherein said phosphorus-containing substance is present in an amount from about 0.1 to about 10.0 weight percent based upon the amount of said alkanolamine present.

3. The process of claim 2, wherein said mixture is heated in the presence of said phosphorus-containing substance at a temperature of from about 275° to about 325° C.

4. The process of claim 3, wherein said alkanolamine compound and said alkyleneamine compound are contacted in a molar ratio of from about 2:1 to about 1:5.

5. The process of claim 4 wherein said alkanolamine is an ethanolamine of the formula:

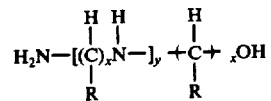

wherein R is hydrogen or lower alkyl, x is 2 and y is 0 to 3 and wherein the alkleneamine is an ethyleneamine of the formula:

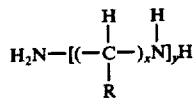

wherein R is hydrogen or lower alkyl, x is 2 and y is a number from 1 to about 4.

6. The process of claim 5 wherein said ethanolamine is monoethanolamine wherein said ethyleneamine is ethylenediamine and wherein said phosphorus-containing substance is phosphorous acid.

7. The process of claim 5 wherein said phosphorus-containing substance is an acid metal phosphate selected from the group consisting of boron phosphate, ferric phosphate and aluminum phosphate.

8. The process of claim 5 wherein said phosphorus-containing substance is selected from a group consisting of phenylphosphinic acid, ethylphosphinic acid, phenylphosphonic acid, naphthaphosphonic acid, methylphosphinic acid, methylphenyl phosphonate, dimethylphenyl phosphonate, ethylphenyl phosphonate and propylmethyl phosphonate.

* * * * *